(12) United States Patent
Wang (10) Patent No.: US 12,484,760 B2
(45) Date of Patent: Dec. 2, 2025

(54) ENDOSCOPE AUXILIARY EXAMINATION SYSTEM, METHOD, APPARATUS, AND STORAGE MEDIUM

(71) Applicant: TIANJIN YUJIN ARTIFICIAL INTELLIGENCE MEDICAL TECHNOLOGY CO., LTD., Tianjin (CN)

(72) Inventor: Yufeng Wang, Tianjin (CN)

(73) Assignee: TIANJIN YUJIN ARTIFICAL INTELLIGENCE MEDICAL TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 18/994,630

(22) PCT Filed: May 31, 2023

(86) PCT No.: PCT/CN2023/097402
§ 371 (c)(1),
(2) Date: Jan. 15, 2025

(87) PCT Pub. No.: WO2024/012080
PCT Pub. Date: Jan. 18, 2024

(65) Prior Publication Data
US 2025/0261828 A1    Aug. 21, 2025

(30) Foreign Application Priority Data
Jul. 15, 2022    (CN) .......................... 202210828744.7

(51) Int. Cl.
*A61B 1/00*    (2006.01)
*A61B 1/273*    (2006.01)

(52) U.S. Cl.
CPC .. *A61B 1/000096* (2022.02); *A61B 1/000094* (2022.02); *A61B 1/00045* (2013.01); *A61B 1/00055* (2013.01); *A61B 1/273* (2013.01)

(58) Field of Classification Search
CPC ........ A61B 1/000096; A61B 1/000094; A61B 1/00045; A61B 1/00055; A61B 1/273
See application file for complete search history.

(56) References Cited

U.S. PATENT DOCUMENTS

2004/0212808 A1* 10/2004 Okawa ............... G02B 23/2484
356/479
2007/0078335 A1* 4/2007 Horn ........................ A61B 1/04
600/425

(Continued)

FOREIGN PATENT DOCUMENTS

CN    111415564 A    7/2020

OTHER PUBLICATIONS

Xu Ming et al. Research on Digestive Endoscopy Assisted Quality Control System Based on Deep Learning (Including Videos) Chinese Journal of Digestive Endoscopy, vol. 38, No. 2.

*Primary Examiner* — Michael J Carey
*Assistant Examiner* — William B Chou
(74) *Attorney, Agent, or Firm* — Birchwood IP (57) ABSTRACT

The present application relates to an endoscope auxiliary examination system, a method, an apparatus, and a storage medium. The system comprises: an anatomical part identification module, used to perform frame-by-frame identification on collected endoscope examination images, determine every observation point part corresponding to each frame of the endoscope examination images, and map each observation point part to a preset site part; an attention recording module, used to determine a site part observation sequence according to a recorded observation time of each observation point part and an observation completeness of (Continued)

each site part determined by the anatomical part identification module; and a guidance module, used to determine a target site to be moved to, according to a current site part corresponding to a current frame endoscope examination image determined by the anatomical part identification module, the site part observation sequence and a preset physical depth of the current site part, and guiding endoscopic examination according to the current site part and the target site. According to the present application, an endoscopist is guided to operate an endoscope according to the most efficient route.

8 Claims, 3 Drawing Sheets (56) References Cited

U.S. PATENT DOCUMENTS

| | | | |
|---|---|---|---|
| 2007/0292011 A1* | 12/2007 | Nishimura | A61B 5/7264 382/128 |
| 2008/0039692 A1* | 2/2008 | Hirakawa | A61B 1/00045 600/160 |
| 2010/0086286 A1* | 4/2010 | Lee | H04N 9/8233 600/109 |

* cited by examiner

ENDOSCOPE AUXILIARY EXAMINATION SYSTEM, METHOD, APPARATUS, AND STORAGE MEDIUM

CROSS-REFERENCE TO RELATED APPLICATIONS

The present disclosure claims the priority to Chinese Patent Application No. 202210828744.7, filed to the Chinese Patent Office on Jul. 15, 2022 and entitled "AUXILIARY ENDOSCOPY SYSTEM, METHOD AND DEVICE, AND STORAGE MEDIUM", which is incorporated in its entirety herein by reference.

TECHNICAL FIELD

The present disclosure relates to the technical field of medical treatment, and in particular to an auxiliary endoscopy system, method and device, and a storage medium.

BACKGROUND OF THE INVENTION

Gastroscopy, as an important method of detecting abnormalities in an upper digestive tract, is the golden standard for diagnosing disorders of an esophagus, a stomach, a duodenum, and other upper digestive tracts. In existing gastroscopies, it is necessary to determine a part of a stomach captured in a video image by the endoscope. A complete gastroscopy report usually contains at least 31 images of 10 areas: an oropharynx, an esophagus, a cardia, a fundus of a stomach, a body of the stomach, angles of the stomach, an antrum of the stomach, a pylorus, a duodenal bulb and a descending part of the duodenum, as well as closer and more detailed pictures if lesions or suspicious areas are found. Digestive endoscopists are required to take real-time pictures during a gastroscopy and conduct further examinations in a timely manner when suspicious areas are detected.

Currently, it takes a long time of experience for a digestive endoscopist to complete a gastroscopy smoothly and fluently. For a less experienced digestive endoscopist, it is often the case that an examination site is missed or that a suspicious area fails to be detected. Missing an examination site requires another painful examination for a patient, wasting the time and money of the patient as well as the examination resources of the hospital. Failing to detect a suspicious area can even put a life of the patient at risk. Furthermore, the digestive endoscopists are largely overloaded. High workload reduces the quality of endoscopy performed by an endoscopist and makes the endoscopy susceptible to incomplete coverage of the examination sites, incomplete examination of lesions, and incomplete image collection.

Consequently, during an upper digestive tract endoscopy, in order to guarantee complete coverage of examination sites and comprehensive examination of lesions, as well as to guarantee that the digestive endoscopist conducts complete and careful observation on mucosa of every site of the upper digestive tract with correct operations to improve quality control in the clinical gastroscopy, an auxiliary upper digestive tract endoscopy technology is urgently needed to assist the digestive endoscopist in completing the upper digestive tract endoscopy smoothly and fluently. Thus, the correctness of operations and the integrity of mucosal observation are guaranteed in every case of upper digestive tract endoscopy.

BRIEF SUMMARY OF THE INVENTION

In order to solve the above technical problems or at least partially solve the above technical problems, the present disclosure provides an auxiliary endoscopy system, method and device, and a storage medium.

In a first aspect, the present disclosure provides an auxiliary endoscopy system. The auxiliary endoscopy system includes:

an anatomic-site identification module configured to identify collected endoscopy images frame by frame, determine each observation point site corresponding to each endoscopy image, and map each observation point site to a preset station site separately;

an attention degree recording module configured to determine a station site observation sequence according to recorded observation times of the observation point sites and observation integrity degrees of the station sites determined by the anatomic-site identification module; and a guide module configured to determine a target station that an endoscope is to be transferred to according to a current station site corresponding to a current endoscopy image determined by the anatomic-site identification module, the station site observation sequence and a preset physical depth of the current station site, and guide endoscopy according to the current station site and the target station.

In a second aspect, the present disclosure provides an auxiliary endoscopy method. The auxiliary endoscopy method includes:

identifying collected endoscopy images frame by frame, determining each observation point site corresponding to each endoscopy image, and mapping each observation point site to a preset station site separately;

determining a station site observation sequence according to recorded observation times of the observation point sites and observation integrity degrees of the station sites;

determining a target station that an endoscope is to be transferred to according to a current station site corresponding to a current endoscopy image, the station site observation sequence and a preset physical depth of the current station site; and guiding endoscopy according to the current station site and the target station.

In a third aspect, the present disclosure provides an auxiliary endoscopy device. The auxiliary endoscopy device includes a memory, a processor, and a computer program stored in the memory and runnable on the processor, where the computer program implements steps of the above auxiliary endoscopy method when executed by the processor.

In a fourth aspect, the present disclosure provides a computer-readable storage medium. The computer-readable storage medium stores an auxiliary endoscopy program, where the auxiliary endoscopy program implements steps of the above auxiliary endoscopy method when executed by a processor.

Compared with the related art, the technical solutions according to the examples of the present disclosure have the advantages as follows:

According to the examples of the present disclosure, a mucosal site of an upper digestive tract observed by an endoscope is identified, a correlation relation between sties of a digestive tract is excavated, and an operation path of endoscopic operation observation is prompted, such that an endoscopist is guided to operate the endoscope according to a most efficient route, repeated examinations are avoided, time is saved, fluency of a gastroscopy is improved, and integrity of gastroscopy observation is guaranteed, and no omission or dead angle is generated.

BRIEF DESCRIPTION OF THE DRAWINGS

The accompanying drawings herein are incorporated into the description as a constituent part of the description, illustrate examples conforming to the present disclosure, and serve to explain the principles of the present disclosure along with the description.

In order to describe the technical solutions in examples of the present disclosure or the prior art more clearly, the accompanying drawings required for describing the examples or the prior art will be briefly described below. Apparently, a person of ordinary skill in the art can also derive other accompanying drawings from these accompanying drawings without creative efforts.

DETAILED DESCRIPTION OF THE INVENTION

It should be understood that the specific example described herein is merely illustrative of the present disclosure and is not intended to limit the present disclosure.

In the following description, suffixes such as "module", "component" or "unit" used to denote elements are used only to facilitate the description of the present disclosure and have no particular meaning in themselves. Thus, "module", "component" or "unit" can be used interchangeably.

Example 1

Figure 1:
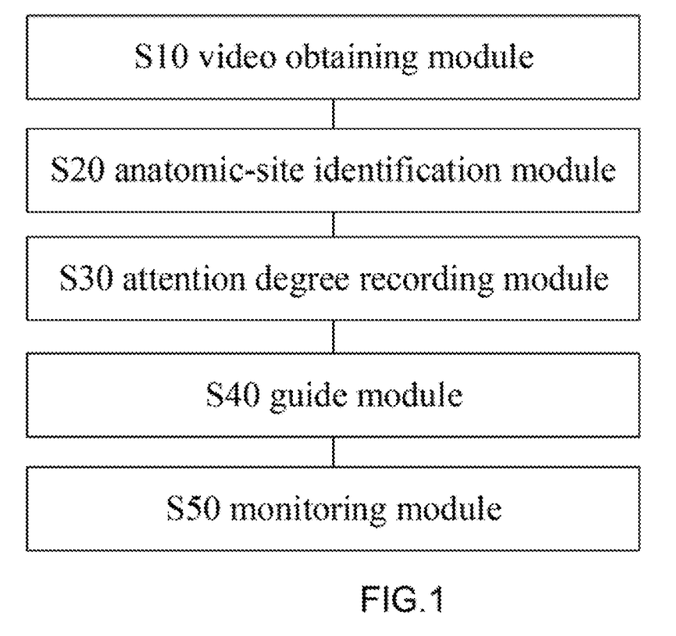
FIG. 1 is a block diagram of an auxiliary endoscopy system according to various examples of the present disclosure.

The example of the present disclosure provides an auxiliary endoscopy system. As shown in FIG. 1, the auxiliary endoscopy system includes:
  S10 video obtaining module configured to use a video capture card to transmit high-definition multimedia interface (HDMI), digital visual interface (DVI), standard data interface (SDI), super-video (S-Video) and other digital/analog video signals to a host computer of the auxiliary endoscope system, read the video signals by means of Opencv, and transcode the video signals into endoscopy images in red-green-blue (RGB) image format frame by frame;
  S20 anatomic-site identification module configured to identify collected endoscopy images frame by frame, determine each observation point site corresponding to each endoscopy image, and map each observation point site to a preset station site separately;
  S30 attention degree recording module configured to determine a station site observation sequence according to recorded observation times of the observation point sites and observation integrity degrees of the station sites determined by the anatomic-site identification module; and
  S40 guide module configured to determine a target station that an endoscope is to be transferred to according to a current station site corresponding to a current endoscopy image determined by the anatomic-site identification module, the station site observation sequence and a preset physical depth of the current station site, and guide endoscopy according to the current station site and the target station.

The example of the present disclosure is particularly useful for a gastroscopy. According to the example of the present disclosure, a mucosal site of an upper digestive tract observed by an endoscope is identified, a correlation relation between sties of a digestive tract is excavated, and an operation path of endoscopic operation observation is prompted, such that an endoscopist is guided to operate the endoscope according to a most efficient route, repeated examinations are avoided, time is saved, fluency of a gastroscopy is improved, and integrity of gastroscopy observation is guaranteed, and no omission or dead angle is generated.

The auxiliary endoscopy system according to the example of the present disclosure is described in detail below in a specific embodiment. The auxiliary endoscopy system includes S10 video obtaining module, S20 anatomic-site identification module, S30 attention degree recording module, S40 guide module and S50 monitoring module.

S10 Video Obtaining Module

A video capture card is used to transmit HDMI, DVI, SDI, S-Video and other digital/analog video signals to a host computer of the auxiliary endoscope system, read the video signals by means of Opencv, and transcode the video signals into images in RGB image format frame by frame.

S20 Anatomic-Site Identification Module

S201 model training unit is configured to train an artificial intelligence neural network multi-label identification model. The model may be implemented by a neural network, such as ResNet, VGG, DenseNet, having a classification function. In the embodiment, in order to improve a classification effect, a convolution layer of a spatial grouping structure, a self-attention network layer, a fully-connected layer and a prediction layer are optionally selected to construct a network structure. That is to say, the model training unit is optionally configured to construct the network structure according to the convolution layer of a spatial grouping structure, the self-attention network layer, the fully-connected layer and the prediction layer, train a pre-labeled sample picture as input information of the network structure, and obtain the neural network multi-label identification model. For example, the numbers of groups of the convolution layers, the self-attention network layers, the fully-connected layers and the prediction layers are 4, 2, 1 and 1 respectively. A training process includes:

Step 2011, the network structure is constructed, where the network is mainly obtained by connecting four groups of convolution layers containing spatial grouping structures, two groups of self-attention network layers, one group of fully-connected layers and one group of prediction layers in series.

Figure 2:
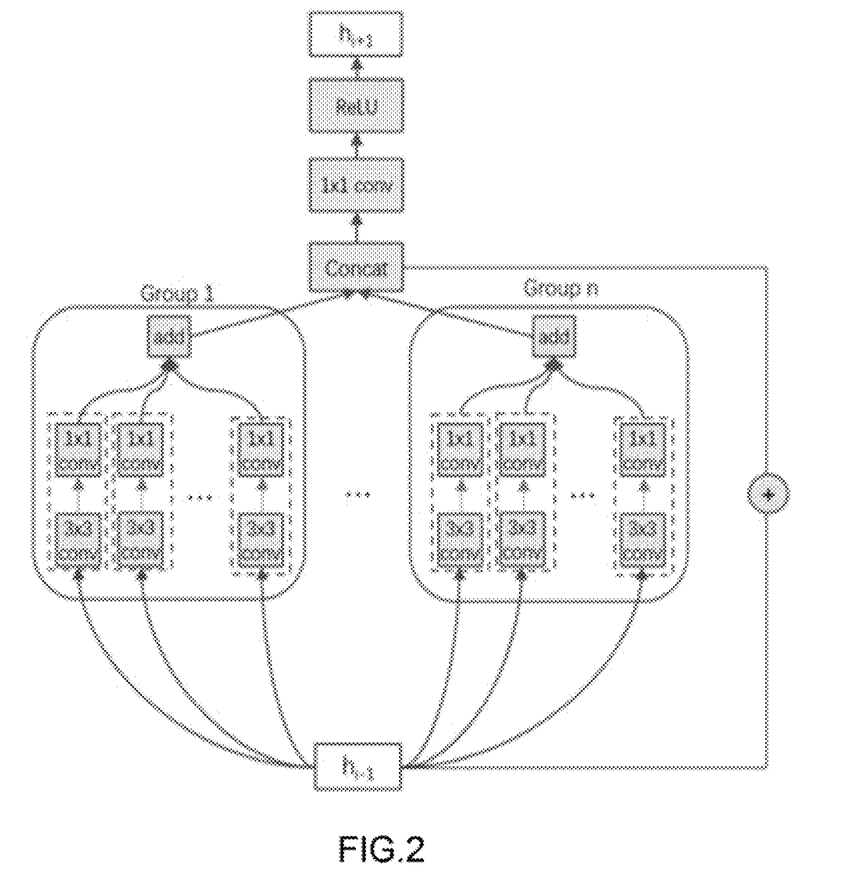
FIG. 2 is a schematic diagram of a convolution layers according to various examples of the present disclosure.

Specifically, each convolution layer containing a spatial grouping structure is shown in FIG. 2. The number of internal groups is set to be 64. A bottleneck width is set to be 32. The convolution layer is configured to perform dimension transformation and feature extraction on the input image, and finally output a feature vector $F_0$.

As for two groups of self-attention network layers, a feature vector $Q_0$ is obtained by performing self-attention weighting on the feature vector $F_0$ by means of the first group of self-attention network layers; and a feature vector $\widetilde{F_0}$ is obtained by performing self-attention weighting jointly on the feature vector $F_0$ and the feature vector $Q_0$ by means of the second group of self-attention network layers.

The fully-connected layer is configured to obtain a one-dimensional feature vector F by performing linear projection on the feature vector $\widetilde{F_0}$ and the feature vector $F_0$.

As for the prediction layer, a probability $(p_0, p_1, \ldots, p_n)$ is obtained by deriving each preset category separately according to the one-dimensional feature vector F as follows:

$$p_n = \text{Sigmoid}(W_n^T \cdot F + b_n)$$

where $p_n$ is a probability of solving for category n, $W_n^T$ is a trainable hyperparameter for category n, and $b_n$ is a trainable biased hyperparameter for category n.

Step 2012, a pre-collected sample picture (an observation picture of an upper digestive tract site) is labeled, and a labeling result is 1-n of preset subdivided anatomic sites (that is, the observation point sites).

Step 2013, the above endoscope image is taken as input information of a neural network model, and calculating is performed according to a pre-labeled multi-label result by using a loss function. The loss function formula is as follows:

$$L(x) = \frac{1}{N}\sum_{n=1}^{N}\begin{cases}(1-p_n)^{\gamma+\log(p_n)}, & y_n = \text{true} \\ (p_n)^{\gamma+\log(1-p_n)}, & y_n = \text{false}\end{cases}$$

where L(x) refers to a loss value of a given input image x during training; N refers to the number of all categories; n refers to the current category; $p_n$ refers to a prediction probability of category n; $\gamma$ refers to a bias value, which usually is 0 or 1, and is 1 in the example; and $y_n$ refers to whether the given input image x has a true value of label n.

Step 2014, after the loss value L(x) is obtained, a model parameter is updated by using back propagation. Specifically, 500 rounds of training are preset, and the above steps 2011 and 2012 are repeated for all labeled data in each round of training until the model reaches the preset number of rounds or the loss value is less than 1e-4, and the constructed neural network model is obtained.

S202 identification unit is configured to identify the collected endoscopy images frame by frame by means of the neural network multi-label identification model trained by the model training unit, and determine each observation point site corresponding to each identification image. That is to say, the images obtained frame by frame are identified by using the trained model, and finally a subdivision anatomic site identification result, that is, an observation point site $T_{\{1, 2, \ldots, j\}}$ currently observed, is obtained through prediction of the prediction layer.

S203 anatomic-site mapping unit is configured to map each observation point site to a preset station site according to a preset mapping relation between the observation point sites and the station sites. In other words, station site mapping is performed on the obtained subdivision anatomic site identification result correspondingly. A mapping relation is as follows. A station site identification result, that is, a station site $T_i$ currently observed, is obtained. Corresponding physical depths can be set for the station sites according to the endoscopy sequence, and the physical depth in the embodiment is 9 levels.

| Station site | Physical depth | Observation point site | Observation orientation |
|---|---|---|---|
| Esophagus | 1 | Upper section of esophagus | Front |
| | | Middle section of esophagus | Middle |
| | | Lower section of esophagus | Rear |
| Fundus of stomach | 2 | Anterior wall of fundus of stomach | Left |
| | | Lesser curvature of fundus of stomach | Top |
| | | Posterior wall of fundus of stomach | Right |
| | | Greater curvature of fundus of stomach | Bottom |
| Upper middle part of body of stomach | 3 | Anterior wall of upper middle part of body of stomach | Left |
| | | Lesser curvature of upper middle part of body of stomach | Top |
| | | Posterior wall of upper middle part of body of stomach | Right |
| | | Greater curvature of upper middle part of body of stomach | Bottom |
| Upper middle part of body of stomach (Endoscope reversing) | 4 | Anterior wall of upper middle part of body of stomach | Bottom |
| | | Lesser curvature of upper middle part of body of stomach | Left |
| | | Posterior wall of upper middle part of body of stomach | Top |
| Lower part of body of stomach | 5 | Anterior wall of lower part of body of stomach | Left |
| | | Lesser curvature of lower part of body of stomach | Top |
| | | Posterior wall of lower part of body of stomach | Right |
| | | Greater curvature of lower part of body of stomach | Bottom |

| Station site | Physical depth | Observation point site | Observation orientation |
|---|---|---|---|
| Angle of stomach | 6 | Anterior wall of angle of stomach | Left |
| | | Lesser curvature of angle of stomach | Middle |
| | | Posterior wall of angle of | Right |
| Antrum of stomach | 7 | Anterior wall of antrum of stomach | Left |
| | | Lesser curvature of antrum of stomach | Top |
| | | Posterior wall of antrum of stomach | Right |
| | | Greater curvature of antrum of stomach | Bottom |
| Duodenal bulb | 8 | Duodenal bulb | — |
| Descending part of duodenum | 9 | Descending part of duodenum | — |

In the example, four groups of convolution layers abstract features from a two-dimensional (2D) endoscope image to obtain an output feature vector, the first attention layer is configured to perform attention weighting on an interior of the one-dimensional feature vector to obtain a weighted feature $Q_0$, and then the second attention layer is configured to perform attention weighting on the features $F_0$ and $Q_0$ jointly to obtain a feature $\widetilde{F_0}$. Inference steps from $Q_0$ to $\widetilde{F_0}$ may establish a correlation between an $F_0$ global region and an $F_0$ key region, thus bringing better performance to multi-label identification.

S30 Attention Degree Recording Module

S301 time recording unit is configured to record the observation times of the observation point sites and the observation integrity degrees of the station sites determined by the anatomic-site identification module frame by frame, and determine a station site observation sequence and an observation point site observation sequence according to the observation times of the observation point sites and the observation integrity degrees of the station sites.

First, the observation integrity degrees of the station sites and the observation times of the observation point sites are recorded by using the time recording unit. Specifically, a number of frames of the obtained observation point site identification result may be recorded, an accumulated recording amount is converted into a time for storage in real time, and the observation point site observation sequence $M_n=[m_1, m_2, \ldots, m_n]$ is obtained.

Secondly, according to the observation times of the observation point sites and the site mapping relation, an integrity degree of each station site is counted (the integrity degree is obtained according to the following formula), and the station site set observation sequence $M_k=[o_1, o_2, \ldots, o_k]$ is obtained.

$$o = \frac{m_1/b}{n} + \ldots + \frac{m_n/b}{n}$$

where b represents the optimal observation time of the observation point site, $m_n$ represents the observation time of each target observation point site corresponding to the station site, and n represents the number of target observation point sites corresponding to the station site.

S302 thermodynamic diagram display unit is configured to display the observation point site observation sequence on the digestive tract UI in a thermodynamic diagram form. That is to say, the observation point site observation sequence $M_n$ of the time recording unit is displayed on the graphical user interface (GUI) in a form of a thermodynamic diagram. After the endoscopy is completed, the thermodynamic diagram may be viewed to review a length of time that the endoscopist pays attention to each site during the entire examination. According to the length of time, the entire examination process may be analyzed afterwards, which sites lack enough attention and which sites receive the attention of the endoscopist. Specifically, the example uses a thermodynamic diagram module to represent attention time. The thermodynamic diagram is drawn by WebCanvas, and partition of the thermodynamic diagram is determined according to subdivision of anatomic sites, then the recorded observation point site observation sequence $M_n=[m_1, m_2, \ldots, m_n]$ is mapped to saturation, and corresponding color blocks are colored.

S40 Guide Module

It is used for route guidance planning in gastroscopy. According to the calculation result, the most reasonable examination route is prompted on the display interface to guide the endoscopist to carry out the most efficient operation of gastroscopy, including:

S401 probability prediction guide unit is configured to determine a station site transfer probability matrix according to the current station site, the station site observation sequence and the preset physical depth of the current station site, and determine a maximum value in the station site transfer probability matrix as the target station. Specifically, the station site transfer probability matrix $S_k=[s_1, s_2, \ldots, s_k]$ ($s_k$ represents a probability of transferring from the current station site to a station site k) is calculated according to the current observation station site T; in S20, the station site observation sequence $M_k$ in S30 and the preset physical depth D by using the first objective function, and the maximum value in the matrix is calculated to obtain the new target station $T_{i'}$ or target observation point $T_n$.

The first objective function is:

$$s_{i'} = \text{Sigmoid}\left(\frac{1-M_k(i')}{|D_i - D_{i'}|+\lambda} \times \left(\frac{2}{1-e^{(D_i-D_{i'})}}-1\right)\right), i' \in k$$

where $s_{i'}$ represents a probability of transferring to the target station i', $M_k(i')$ represents an observation integrity degree of the target station i', $D_{i'}$ represents a physical depth of the target station i', $D_i$ represents a physical depth of a station site i, and λ is an arbitrary constant (λ>0), which is 1 in the example.

S402 prompt guide unit is configured to draw a station guide line between the current station and the target station on a preset digestive tract user interface (UI) in response to determining that the target station is different from the current station site; and alternatively, prompt a standard endoscopic operation of endoscopy according to a preset observation orientation of a target observation point site, that an endoscope is to be transferred to, determined by the probability prediction guide unit in response to determining that the target station is the same as the current station site.

In detail, in a case that a new target station appears, an animation guide prompt is performed on the preset upper digestive tract UI interface according to the new target station. A station guide line is drawn by using a Bézier curve in a UI model, so as to prompt a user to advance or withdraw the endoscope to the target station $T_{i'}$.

In a case that observation is continuously performed at the current station site, a new target observation point and a corresponding preset orientation of the target observation point site are obtain according to the second objective function. The user is prompted to rotate leftwards, rotate rightwards, move forwards, move backwards or continuously observe. A rotation animation at a node is drawn.

In detail, in a case that $T_{i'} \neq T_i$, the animation guide prompt is performed on the preset upper digestive tract UI according to a new target node that an endoscope is to be transferred to by using the prompt guide unit. The station guide line is drawn by using a Bézier curve in a UI model. A green dynamic flashing connecting line from $T_i$ to $T_k$ is drawn to prompt. Furthermore, a text prompt of "endoscope advance" or "endoscope withdrawal" is made according to the preset physical depth.

In a case that $T_{i'} = T_i$, it indicates that observation should be continuously performed at the current station site. The observation point site transfer probability matrix $S_n = [s_1, s_2, \ldots, s_n]$ ($s_n$ represents a probability of transferring from the current observation point site to the target observation point site n) is calculated by using a second objective function. The maximum value in the matrix is calculated to obtain the new target observation point site $T_n$.

The second objective function is:

$$s_n = \frac{1}{1 - e^{(b(n) - M_n(n))}}, n \in O(i)$$

where $s_n$ represents a probability of transferring to the target observation point site n, $M_n(n)$ represents an observation time of the target observation point site n, b(n) represents an optimal observation time (being 10 seconds) of the target observation point site n, and O(i) represents a target observation point site set corresponding to the station site i.

By using the prompt guide unit, characters of rotating leftwards, rotating rightwards, advance, withdrawal, or continuous observation are prompted according to the preset orientation of the observation point site, and are drawn on a rotation operation animation at the station $T_{i'}$.

In the example, two objective functions are applied to deduce the AI identification result to obtain the transfer site. Moreover, operation prompts conforming to a current state are given according to the orientation and depth of the preset site in a real world. Compared with fixed prompts in the prior art, an examination effect can be effectively improved.

S50 Monitoring Module

S501 endoscopic operation identification unit is configured to identify a current endoscopic operation. Specifically, the observation matrix of S30 is modeled to obtain a pre-trained endoscopic operation identification model. Operations of endoscope turning, endoscope advance, endoscope withdrawal, etc. by the endoscopist are identified. A current endoscopic operation is obtained. In a case that it is detected that the endoscopist executes an incorrect operation, the system prompts, such that endoscopists with different levels can perform examination according to the standard operations.

In detail, a sequence queue matrix is first used, the station site identification result and the observation point site identification result in S20 are obtained once every 0.5 second, and stored in the sequence queue matrix. A total of 20 groups of identification results are stored for 10 seconds. When results of the 11th second is stored, the original results of the 1st second are discarded, and the results of the 11th second are inserted at an end of the sequence queue matrix.

Second, an endoscopic operation identification model is constructed. First, a content of the sequence queue matrix is collected, and an operation of each sequence queue matrix is manually labeled. The operations include seven conventional actions of "in-situ observation", "lens zoom in", "lens away", "endoscope rotating leftwards", "endoscope rotating rightwards", "endoscope advance" and "endoscope withdrawal", so as to construct a data set for model training.

The model is constructed by a dynamic Bayesian network. Each sequence queue matrix in the labeled data set is taken as input. An expectation maximization (EM) algorithm is used to train parameters of the dynamic Bayesian network. The preset endoscopic operation identification model is obtained.

Finally, the sequence queue matrix is continuously collected according to rules in the examination process, and an endoscopic operation is identified by the preset endoscopic operation identification model.

S502 deviation warning unit is configured to give a prompt on the digestive tract UI in response to determining that the current endoscopic operation is inconsistent with the standard endoscopic operation. That is to say, according to a guide operation prompted by the S40 module and the identified current endoscopic operation, a text prompt appears on the GUI. In a case that the endoscopic operation is contrary to a transfer node, a prominent mark appears on the GUI, and an animation guide prompt is given. That is to say, the guide operation displayed in S40 is obtained, and it is determined whether the guide operation displayed in S40 coincides with the endoscopic operation executed by an operator. In a case that they do not coincide, the GUI gives a warning prompt, for example, a red exclamation mark is displayed in an upper right corner of an animation area to give a prompt to the user.

An artificial intelligence neural network multi-label classification model is used in the examples of the present disclosure to perform multi-label identification on gastroscope images. In gastroscopy, a plurality of observation point sites usually appear in a same field of view captured by a lens, such as an anterior wall of an antrum of a stomach and a lesser curvature of an antrum of a stomach, a lesser curvature of a fundus of a stomach, and a posterior wall of a fundus of a stomach. The examples of the present disclosure are closer to a clinical actual scene, and statistics are more accurate.

According to the examples of the present disclosure, a neural network model consisting of four groups of convolution layers, two groups of attention layers and one group of multi-label prediction layers is used. The four groups of convolution layers abstract features from a 2D image to obtain a feature $F_0$, the first attention layer is configured to perform attention weighting on an interior of a feature F to obtain a feature $Q_0$, and the second attention layer is configured to perform attention weighting on the features $F_0$ and $Q_0$ jointly to obtain a feature $\widetilde{F_0}$. Inference steps from $Q_0$ to $\widetilde{F_0}$ are intended to establish a correlation between an $F_0$ global region and an $F_0$ key region, thus bringing better performance for multi-label identification.

A gastroscopy guiding mode disclosed in the examples of the present disclosure may provide a gastroscopist with refined full-coverage operation prompts, and specifically, prompt the endoscopist to advance or withdraw a gastroscope when a station transfers, and to turn the gastroscope left or right when a target observation point site transfers.

According to an identification mode for gastroscopist operations proposed in the examples of the present disclosure, current gastroscopy operations of the gastroscopist are inferred by means of the multi-label observation sequence and a machine learning method, and early warning information is given in combination with S4 module.

According to a presentation mode and interface of a gastroscopist attention degree proposed in the examples of the present disclosure, the multi-label identification result may be recorded, and a thermodynamic diagram of the recorded result may be formed for display.

According to the examples of the present disclosure, a traveling route and an observation angle of the gastroscopy may be prompted in real time for the gastroscopist, and respectively correspond to gastroscope advance and withdrawal and lens rotation by the gastroscopist. The prompt is simple and easy to understand, and repetition and omission of examination sites are reduced.

According to the examples of the present disclosure, consistency between an actual operation route and the preset route may be fed back in real time. The gastroscopist may be helped to correct the deviation at once. Compared with feedback of only covered sties and traveled routes in the prior art, the navigation function has an intelligent tracking prediction effect being more outstanding.

In the examples of the present disclosure, the thermodynamic diagram vividly records an entire site observation process of the gastroscopist, is objective feedback of an subjective attention degree of the gastroscopist, is equivalent to planarizing a gastroscopy flow, and is a major innovation of an examination feedback means.

According to the examples of the present disclosure, an examination progress of an endoscopist is displayed by means of identification of the current site where a gastroscope is located and association analysis of the site, an appropriate examination path is provided, more scientific guide for endoscopic operations is provided for an operator, integrity and fluency of an examination are improved, repeated examination and omission are avoided, and pain of a patient is reduced. According to the present disclosure, endoscopists with different levels can be improved to a level conforming to basic specifications.

Example 2

Figure 3:
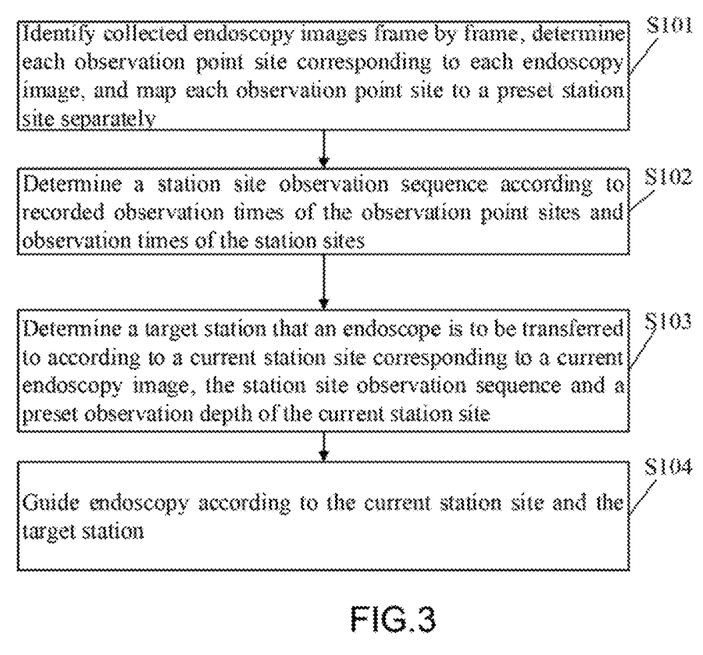
FIG. 3 is a flowchart of an auxiliary endoscopy method according to various examples of the present disclosure.

The example of the present disclosure provides an auxiliary endoscopy method. As shown in FIG. 3, the auxiliary endoscopy method includes:

S101, collected endoscopy images are identified frame by frame, each observation point site corresponding to each endoscopy image is determined, and each observation point site is mapped to a preset station site separately;

S102, a station site observation sequence is determined according to recorded observation times of the observation point sites and observation integrity degrees of the station sites;

S103, a target station that an endoscope is to be transferred to is determined according to a current station site corresponding to a current endoscopy image, the station site observation sequence and a preset physical depth of the current station site; and S104, endoscopy is guided according to the current station site and the target station.

According to the example of the present disclosure, an examination progress of an endoscopist is displayed by means of identification of the current site where a gastroscope is located and association analysis of the site, an appropriate examination path is provided, more scientific guide for endoscopic operations is provided for an operator, integrity and fluency of an examination are improved, repeated examination and omission are avoided, and pain of a patient is reduced. According to the present disclosure, endoscopists with different levels can be improved to a level conforming to basic specifications.

In some examples, S101 includes: the observation integrity degrees of the station sites and the observation times of the observation point sites are recorded frame by frame, and the station site observation sequence is determined according to the observation times of the observation point sites and the observation times of the station sites.

S102 includes: a station site transfer probability matrix is determined according to the current station site, the station site observation sequence and the preset physical depth of the current station site, and a maximum value in the station site transfer probability matrix is determined as the target station.

A station guide line between the current station and the target station is drawn on a preset digestive tract user interface (UI) in response to determining that the target station is different from the current station site; and alternatively, a standard endoscopic operation of endoscopy is prompted according to a preset observation orientation of a target observation point site, that an endoscope is to be transferred to, determined by the probability prediction guide unit in response to determining that the target station is the same as the current station site.

Optionally, a station site transfer probability is determined by means of a first objective function, and the target observation point site is determined by means of a second objective function according to an observation time of the current station site and an observation site set of the current site.

The first objective function is:

$$s_{i'} = \text{Sigmoid}\left(\frac{1 - M_k(i')}{|D_i - D_{i'}| + \lambda} \times \left(\frac{2}{1 - e^{(D_i - D_{i'})}} - 1\right)\right), i' \in k$$

where $s_{i'}$ represents a probability of transferring to the target station i', $M_k(i')$ represents an observation integrity degree of the target station i', $D_{i'}$ represents a physical depth of the target station i', $D_i$ represents a physical depth of a station site i, and $\lambda$ is an arbitrary constant.

The second objective function is:

$$s_n = \frac{1}{1 - e^{(b(n)-M_n(n))}}, n \in O(i)$$

where $s_n$ represents a probability of transferring to the target observation point site n, $M_n(n)$ represents an observation time of the target observation point site n, b(n) represents an optimal observation time of the target observation point site n, and O(i) represents a target observation point site set corresponding to the station site i.

Optionally, S102 further includes: the observation integrity degrees of the station sites and the observation times of the observation point sites determined by the anatomic-site identification module frame by frame are recorded, and an observation point site observation sequence is determined according to the observation times of the observation point sites and the observation integrity degrees of the station sites; and the observation point site observation sequence is displayed on the digestive tract UI in a thermodynamic diagram form.

In some examples, the auxiliary endoscopy method further includes: a current endoscopic operation is identified; and a prompt is given on the digestive tract UI in response to determining that the current endoscopic operation is inconsistent with the standard endoscopic operation.

Example 3

The example of the present disclosure provides an auxiliary endoscopy device. The auxiliary endoscopy device includes a memory, a processor, and a computer program stored in the memory and runnable on the processor.

The computer program implements steps of the auxiliary endoscopy method according to any one of items of Example 2 when executed by the processor.

Example 4

The example of the present disclosure provides a computer-readable storage medium. The computer-readable storage medium stores an auxiliary endoscopy program, where the auxiliary endoscopy program implements steps of the auxiliary endoscopy method according to any one of items of Example 2 when executed by a processor.

For specific implementation of Examples 2-4, reference may be made to Example 1, and corresponding technical effects are achieved.

It should be noted herein that the terms "comprise", "include", or their any other variations are intended to cover non-exclusive inclusion. Therefore, a process, method, product, or apparatus including a series of elements further includes other elements that are not explicitly listed except for those elements, or further includes elements inherent to such a process, method, product, or apparatus. Without more restrictions, the elements defined by the sentence "comprise a . . . " and "include a . . . " do not exclude the existence of other identical elements in the process, method, article, or device including the elements.

The serial numbers of the above examples of the present disclosure are merely for description and do not represent the superior and inferior of the examples.

Through the description of embodiments, those skilled in the art can clearly understand that the method of the above example may be implemented in combination of software and a necessary general-purpose hardware platform and may also be certainly implemented through hardware. However, the former is a preferred embodiment in many cases. Based on such understanding, the technical solution in essence of the present disclosure or the part that contributes to the prior art can be embodied in the form of software products. The computer software product is stored in one storage medium (such as a read-only memory (ROM)/a random access memory (RAM), a magnetic disk, or an optical disk), and includes several instructions to make one terminal (such as a mobile phone, a computer, a server, an air conditioner, or a network device) execute the method of each example of the present disclosure.

The examples of the present disclosure have been described above in conjunction with the accompanying drawings, but the present disclosure is not limited to the specific embodiments described above which are merely illustrative and not limiting. Under the inspiration of the present disclosure, those skilled in the art can make various forms without departing from the spirit of the present disclosure and the scope of protection of the claims, all of which belong to the protection of the present disclosure.

What is claimed is:

1. An auxiliary endoscopy system, comprising:
an anatomic-site identification module configured to identify collected endoscopy images frame by frame, determine each observation point site corresponding to each endoscopy image, and map each observation point site to a preset station site separately;
an attention degree recording module configured to determine a station site observation sequence according to recorded observation times of the observation point sites and observation integrity degrees of the station site determined by the anatomic-site identification module; and
a guide module configured to determine a target station that an endoscope is to be transferred to according to a current station site corresponding to a current endoscopy image determined by the anatomic-site identification module, the station site observation sequence and a preset physical depth of the current station site, and guide endoscopy according to the current station site and the target station;
the attention degree recording module comprises a time recording unit, and the guide module comprises a probability prediction guide unit and a prompt guide unit;
the time recording unit is configured to record the observation integrity degrees of the station sites and the observation times of the observation point sites determined by the anatomic-site identification module frame by frame, and determine the station site observation sequence according to the observation times of the observation point sites and the observation integrity degrees of the station sites;
the probability prediction guide unit is configured to determine a station site transfer probability matrix according to a current station site, the station site observation sequence and the preset physical depth of the current station site, and determine a maximum value in the station site transfer probability matrix as the target station; and the prompt guide unit is configured to draw a station guide line between a current station and the target station on a preset digestive tract user interface (UI) in response to determining that the target station is different from the current station site; and alternatively, prompt a standard endoscopic operation of endoscopy according to a preset observation orientation of a target observation point site, that the endoscope is to be transferred to, determined by the probability prediction guide unit in response to determining that the target station is the same as the current station site;

wherein the probability prediction guide unit is further configured to determine a station site transfer probability by means of a first objective function, and determine the target observation point site by means of a second objective function according to an observation time of the current station site and an observation site set of the current site;

the first objective function is:

$$s_{i'} = \text{Sigmoid}\left(\frac{1 - M_k(i')}{|D_i - D_{i'}| + \lambda} \times \left(\frac{2}{1 - e^{(D_i - D_{i'})}} - 1\right)\right), i' \in k$$

wherein $s_{i'}$ represents a probability of transferring to the target station i', $M_k(i')$ represents an observation integrity degree of the target station i', $D_{i'}$ represents a physical depth of the target station i', $D_i$ represents a physical depth of a station site i, and $\lambda$ is an arbitrary constant; and the second objective function is:

$$s_n = \frac{1}{1 - e^{(b(n) - M_n(n))}}, n \in O(i)$$

wherein $s_n$ represents a probability of transferring to the target observation point site n, $M_n(n)$ represents an observation time of the target observation point site n, b(n) represents an optimal observation time of the target observation point site n, and O(i) represents a target observation point site set corresponding to the station site i.

2. The auxiliary endoscopy system according to claim 1, wherein the attention degree recording module further comprises a thermodynamic diagram display unit;

the time recording unit is configured to record the observation integrity degrees of the station sites and the observation times of the observation point sites determined by the anatomic-site identification module frame by frame, and determine an observation point site observation sequence according to the observation times of the observation point sites and the observation integrity degrees of the station sites; and the thermodynamic diagram display unit is configured to display the observation point site observation sequence on the digestive tract UI in a thermodynamic diagram form.

3. The auxiliary endoscopy system according to claim 1, further comprising a monitoring module, wherein the monitoring module comprises an endoscopic operation identification unit and a deviation warning unit;

the endoscopic operation identification unit is configured to identify a current endoscopic operation; and the deviation warning unit is configured to give a prompt on the digestive tract UI in response to determining that the current endoscopic operation is inconsistent with the standard endoscopic operation.

4. The auxiliary endoscopy system according to claim 1, wherein the anatomic-site identification module comprises a model training unit, an identification unit and an anatomic-site mapping unit;

the model training unit is configured to construct a network structure according to a convolution layer of a spatial grouping structure, a self-attention network layer, a fully-connected layer and a prediction layer, train a pre-labeled sample picture as input information of the network structure, and obtain a neural network multi-label identification model;

the identification unit is configured to identify the collected endoscopy images frame by frame by means of the neural network multi-label identification model trained by the model training unit, and determine each observation point site corresponding to each identification image; and the anatomic-site mapping unit is configured to map each observation point site to a preset station site according to a preset mapping relation between the observation point sites and the station sites.

5. The auxiliary endoscopy system according to claim 4, wherein the model training unit is specifically configured to perform dimensional transformation and feature extraction on the input sample picture by means of the convolution layer of a spatial grouping structure, and output a feature vector $F_0$;

obtain a feature vector $Q_0$ by performing self-attention weighting on the feature vector $F_0$ by means of a first group of self-attention network layers; obtain a feature vector $\widetilde{F_0}$ by performing self-attention weighting jointly on the feature vector $F_0$ and the feature vector $Q_0$ by means of a second group of self-attention network layers;

obtain a one-dimensional feature vector F by performing linear projection on the feature vector $\widetilde{F_0}$ and the feature vector $F_0$ by means of the fully-connected layer;

obtain a multi-label identification probability by deriving each preset category separately by means of the prediction layer according to the one-dimensional feature vector F;

perform calculation by using a loss function according to a multi-label result marked in advance, obtain a loss value, and then update a model parameter by using reverse propagation; and obtain the neural network multi-label identification model by stopping when a preset number of rounds is reached or the loss value is less than a preset value.

6. An auxiliary endoscopy method, comprising:

identifying collected endoscopy images frame by frame, determining each observation point site corresponding to each endoscopy image, and mapping each observation point site to a preset station site separately;

determining a station site observation sequence according to recorded observation times of the observation point sites and observation integrity degrees of the station site;

determining a target station that an endoscope is to be transferred to according to a current station site corresponding to a current endoscopy image, the station site observation sequence and a preset physical depth of the current station site; and guiding endoscopy according to the current station site and the target station, wherein the determining a station site observation sequence according to recorded observation times of the observation point sites and observation integrity degrees of the station sites comprises:

the observation integrity degrees of the station sites and the observation times of the observation point sites are recorded frame by frame, and the station site observation sequence is determined according to the observation times of the observation point sites and the observation times of the station sites the determining a target station that an endoscope is to be transferred to according to a current station site corresponding to a current endoscopy image, the station site observation sequence and a preset physical depth of the current station site comprises:

a station site transfer probability matrix is determined according to the current station site, the station site observation sequence and the preset physical depth of the current station site, and a maximum value in the station site transfer probability matrix is determined as the target station;

a station guide line between the current station and the target station is drawn on a preset digestive tract user interface (UI) in response to determining that the target station is different from the current station site; and alternatively, a standard endoscopic operation of endoscopy is prompted according to a preset observation orientation of a target observation point site, that the endoscope is to be transferred to, determined by the probability prediction guide unit in response to determining that the target station is the same as the current station site;

wherein the probability prediction guide unit is further configured to determine a station site transfer probability by means of a first objective function, and determine the target observation point site by means of a second objective function according to an observation time of the current station site and an observation site set of the current site;

the first objective function is:

$$s_{i'} = \text{Sigmoid}\left(\frac{1 - M_k(i')}{|D_i - D_{i'}| + \lambda} \times \left(\frac{2}{1 - e^{(D_i - D_{i'})}} - 1\right)\right), i' \in k$$

wherein $s_{i'}$ represents a probability of transferring to the target station i', $M_k(i')$ represents an observation integrity degree of the target station i', $D_{i'}$ represents a physical depth of the target station i', $D_i$ represents a physical depth of a station site i, and $\lambda$ is an arbitrary constant; and the second objective function is:

$$s_n = \frac{1}{1 - e^{(b(n) - M_n(n))}}, n \in O(i)$$

wherein $s_n$ represents a probability of transferring to the target observation point site n, $M_n(n)$ represents an observation time of the target observation point site n, b(n) represents an optimal observation time of the target observation point site n, and O(i) represents a target observation point site set corresponding to the station site i.

7. An auxiliary endoscopy device, comprising a memory, a processor, and a computer program stored in the memory and runnable on the processor, wherein
the computer program implements steps of the auxiliary endoscopy method according to claim 6 when executed by the processor.

8. A computer-readable storage medium, storing an auxiliary endoscopy program, wherein the auxiliary endoscopy program implements steps of the auxiliary endoscopy method according to claim 6 when executed by a processor.

* * * * *